United States Patent [19]

Pek et al.

[11] Patent Number: 4,591,367
[45] Date of Patent: May 27, 1986

[54] HORIZONTAL GAS/LIQUID SEPARATOR

[75] Inventors: Johan J. B. Pek; Hubertus J. A. Schuurmans, both of Amsterdam, Netherlands

[73] Assignee: Shell Oil Company, Houston, Tex.

[21] Appl. No.: 646,282

[22] Filed: Aug. 30, 1984

[30] Foreign Application Priority Data

Oct. 5, 1983 [GB] United Kingdom ............... 8326664

[51] Int. Cl.$^4$ .............................................. B01D 45/12
[52] U.S. Cl. ...................................... 55/344; 55/347; 55/452
[58] Field of Search ........................... 55/344–349, 55/447, 452

[56] References Cited

U.S. PATENT DOCUMENTS

| 1,847,304 | 3/1932 | Bradshaw et al. | 55/348 X |
|---|---|---|---|
| 1,884,501 | 10/1932 | Andrews et al. | 55/344 |
| 2,281,610 | 5/1942 | Watson et al. | 55/348 X |
| 2,399,509 | 4/1946 | Rich | 55/344 X |
| 2,461,677 | 2/1949 | Burdock et al. | 55/348 |
| 2,670,056 | 2/1954 | Rossiter | 55/344 |
| 2,761,526 | 9/1956 | Kemmetmuller | 55/347 X |
| 2,866,518 | 12/1958 | Lincoln | 55/348 X |
| 4,430,100 | 2/1984 | Cardo | 55/348 X |

FOREIGN PATENT DOCUMENTS 0083811 11/1982 European Pat. Off. .
1123546 8/1968 United Kingdom .

Primary Examiner—Robert Spitzer

[57] ABSTRACT

Horizontal gas/liquid separator comprising a vessel having a gas inlet with a gas inlet channel and a gas outlet with a gas outlet channel. The channels are separated from one another by a horizontal gas/liquid separation zone provided with swirl tubes. To obtain a uniform gas/liquid distribution over the swirl tubes, these swirl tubes are provided with primary gas outlet tubes with different cross sectional areas depending on their location relative to the gas outlet.

10 Claims, 3 Drawing Figures

HORIZONTAL GAS/LIQUID SEPARATOR

BACKGROUND OF THE INVENTION

The present invention relates to a gas/liquid separator and more particularly to a gas/liquid separator in which during operation, a rotary motion is imparted to a stream of liquid-bearing gas inside a separation chamber, whereby liquid particles are thrust outwardly by virtue of their weight and impinge on the inner surface of the wall of the separation chamber where they coalesce into a liquid film which can be separately discharged from the separation chamber via, for example, openings in the wall thereof. Gases leave the separation chamber via a gas outlet, which is substantially concentrical with the longitudinal axis of the separation chamber.

Gas/liquid separators of the above type are widely used in the chemical and the gas treating industries. It should be noted that the term gas is taken throughout this specification and the claims also to invariably include vapor.

Examples of gas/liquid separators in which liquid is separated from a stream of gas by imparting a swirl motion to the gas are, among others, described in British patent specification 1,123,546 and more recently in European patent application 82201420. Both publications describe gas/liquid separators having a plurality of parallel, vertically extending cylindrical walls laterally enclosing separation spaces and mounted in or over openings of a tray, wherein the gas inlets and gas outlets are positioned at opposite sides of the tray. The spaces enclosed by the cylindrical walls are provided with swirl imparting means formed by inclined, preferably fixed, vanes for imparting a rotary motion to a gas/liquid mixture introduced into the tubular elements via their open lower ends. The separated liquid may be discharged from the separation spaces partly through liquid discharge openings provided in the cylindrical walls and partly over the upper ends of said walls. European patent application 82201420 relates to an improved variant of the above generally known type of equipment. This improved separator is in particular intended for an efficient separation of gas/ liquid mixtures at high gas velocities and/or high liquid loadings. The improvement according to the latter patent consists, among others, in the application of primary gas outlet tubes for discharging gas directly from the separation spaces in combination with secondary gas outlet tubes for discharging gas entrained by separated liquid from enclosed liquid collecting spaces surrounding the cylindrical walls defining the separation spaces. The combination of cylindrical wall with liquid discharge openings and rotation imparting means will be hereinafter indicated with the expression swirl tube.

Depending on the dimensions of the swirl tubes, and of the primary and secondary gas outlets, the latter patent separator may be operated at very high gas throughputs per swirl tube without substantial impairment of the separation efficiency. At a given configuration and given dimensions of the swirl tubes, and of the primary and the secondary gas outlet tubes, the required throughput in a gas/liquid separator provided with swirl tubes, determines the number of swirl tubes which should be applied. The number of swirl tubes in its turn determines the cross sectional area of the separator vessel, which normally is vertically arranged for operation. Since the vessel itself forms a major contribution to the total manufacturing costs of a gas/ liquid separator it is worthwhile to design vessels having dimensions, i.e., length and diameter, as small as possible at a given required throughput of the vessel. If the required throughput necessitates the use of a large number of swirl tubes, it may be economically more attractive to install the swirl tubes on a horizontal tray in a horizontally extending cylindrical vessel, wherein the swirl tube tray divides the interior of the vessel into a gas inlet channel and a gas outlet channel. The available height may also necessitate the application of horizontal vessels instead of vertical vessels.

Although a horizontal separator with swirl tubes may be attractive from a manufacturing point of view, two main operational problems occur when such a vessel with a relatively large tray for mounting a large number of swirl tubes, is to be operated at high gas load factors. These problems are in the first place, gas maldistribution over and in the swirl tube tray resulting in a poor separation efficiency and, in the second place, problems adhered with the liquid discharge from the swirl tube tray. In the below these phenomena will be discussed in detail.

SUMMARY OF THE INVENTION

Applicants have now found that at high gas throughputs the velocity differences occurring in the gas inlet channel and in the gas outlet channel will cause pressure gradients in these channels. Due to this phenomenon the pressure drop over the swirl tube tray will not be uniform, resulting in maldistribution over the swirl tubes. In the gas inlet channel the gas flow mass decreases in the length direction from the main separator inlet, due to flowing of gas into the swirl tubes. This effect, in terms of flow properties, is in fact the same as the effect resulting from increasing the cross sectional area of a passage available for a constant gas flow mass. In the gas outlet channel the reverse effect occurs during operation, since due to the accumulation of the gas flows from the swirl tubes, the flow mass in the gas outlet channel increases toward the main separator gas outlet. Owing to the velocity differences over the gas inlet channel and over the gas outlet channel, the static pressure in the gas inlet channel increases from the main separator inlet, while the static pressure in the gas outlet channel decreases toward the main separator gas outlet.

According to one aspect of the present invention the gas maldistribution caused by the static pressure profiles in the gas inlet channel and gas outlet channel as found by Applicants, may be overcome by reducing the primary gas outlet diameters of the swirl tubes in the direction toward the main separator gas outlet, resulting in differences in pressure drops over the swirl tubes.

With respect to the hereinbefore mentioned problem of liquid discharge from the swirl tube tray of a horizontal gas/liquid separator, the following has been investigated by Applicants. Normally, the liquid separated from the gas in the swirl tubes is discharged from the swirl tube tray via one or more drain pipes. Applicants have found that in order to be able to reduce the diameter of the cylindrical separator as much as possible without, however, impairment of the separation efficiency at high gas loads and therefore high gas velocities, the separator should be provided with a liquid collecting space separated from the gas inlet channel and the gas outlet channel. If the collected liquid would not be properly separated from the main gas flow, high gas velocities light easily give rise to wave formation of the collected liquid, involving the risk of liquid re-entrainment by the gas flow.

Summarizing, the object of the present invention is to provide a horizontal gas/liquid separator suitable for very high gas throughputs, in which the above problems related to gas maldistribution and liquid discharge have been substantially eliminated.

BRIEF DESCRIPTION OF THE DRAWINGS

The invention will now be further explained with reference to the accompanying drawings, in which.

DESCRIPTION OF THE PREFERRED EMBODIMENT

Figure 1:
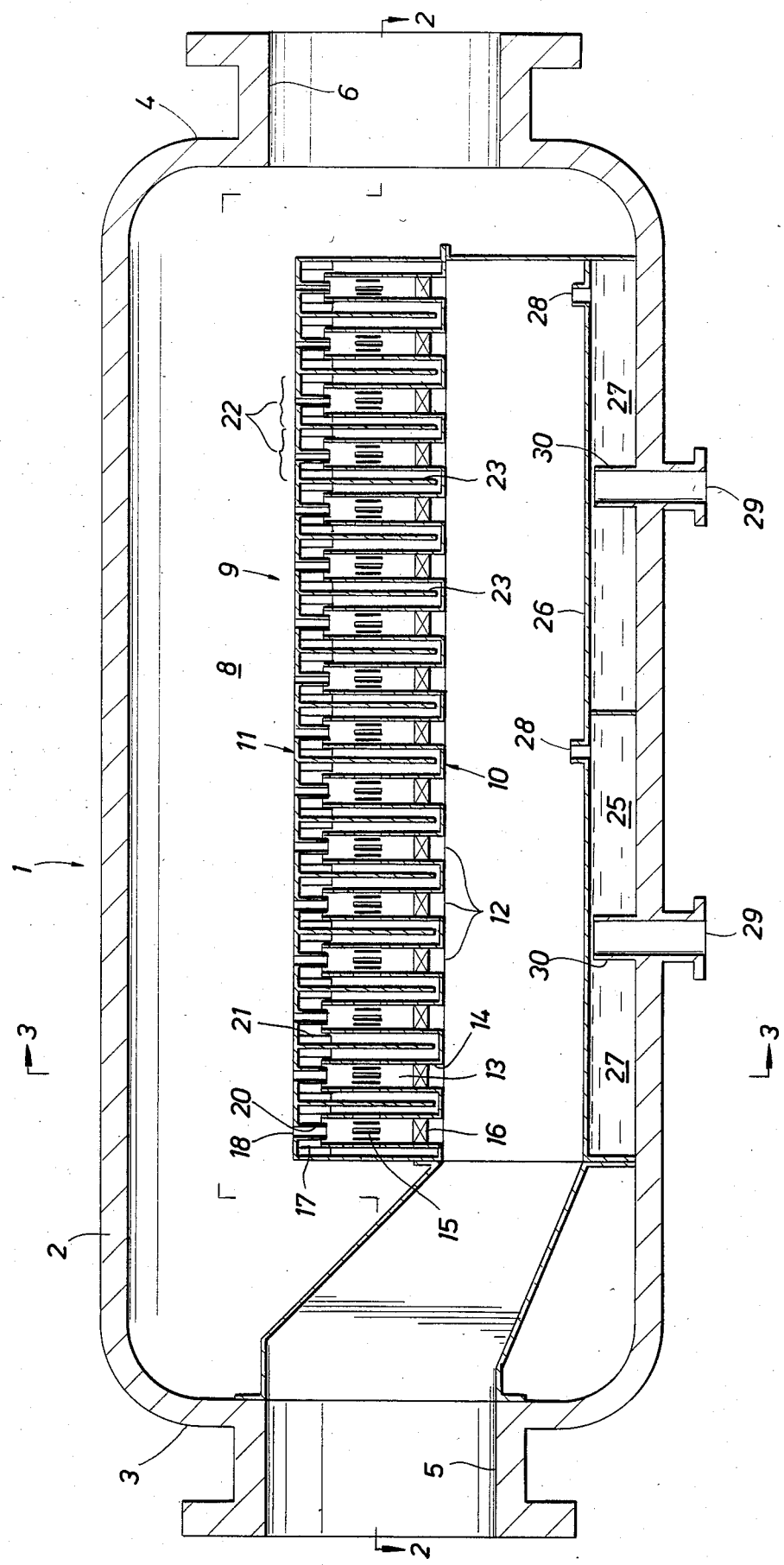
FIG. 1 shows a vertical section of a gas/liquid separator according to the invention.
Figure 2:
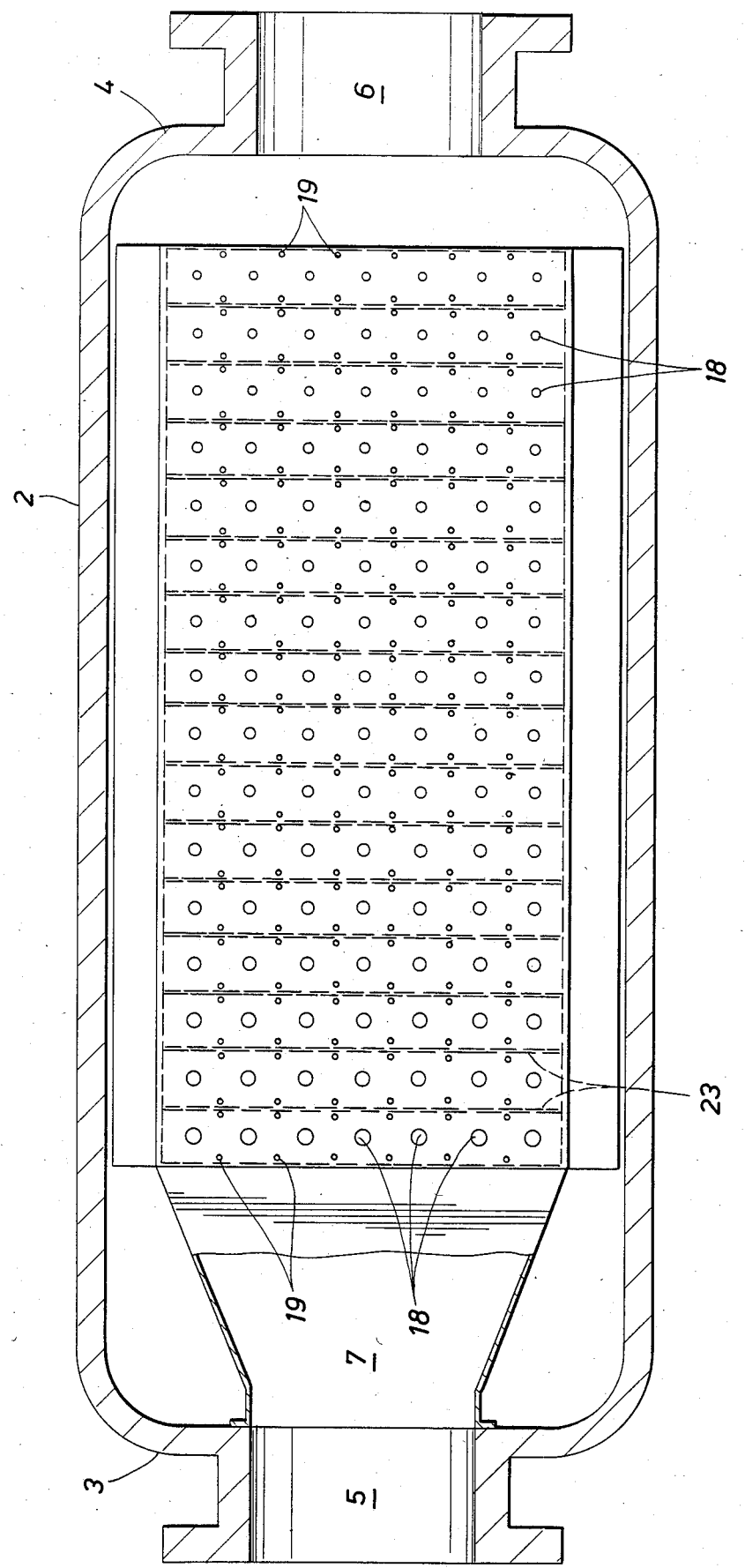
FIG. 2 shows a horizontal section of the separator taken along lines II—II of FIG. 1.

The horizontal gas/liquid separator suitable for very high gas throughputs, thereto comprises according to the invention a substantially horizontal, cylindrical vessel having a gas inlet communicating with a gas inlet channel, and a gas outlet communicating with a gas outlet. The gas inlet channel and the gas outlet channel are separated from one another by a substantially horizontal gas/liquid separation zone extending over substantially the length of the vessel. The gas/liquid separation zone is bounded by a pair of substantially horizontal trays vertically spaced apart and provided with openings for the passage of gas from the gas inlet channel to the gas outlet channel. A plurality of substantially equally spaced swirl tubes as hereinbefore defined, are mounted in or over openings of the lower tray of said pair of trays and having their upper ends arranged below the upper tray of said pair. A plurality of primary gas outlet tubes are mounted in openings of the upper tray substantially coaxially arranged with the swirl tubes and having their lower ends arranged inside said swirl tubes. The cross sectional areas of the primary gas outlet tubes decrease toward the gas outlet to such an extent that during operation gas is substantially uniformly distributed over the swirl tubes. The separator further includes a liquid collecting zone with a liquid outlet, which liquid collecting zone is separated from the gas inlet channel, and a liquid withdrawal pipe forming a fluid communication between the lower part of the separation zone and the liquid collecting zone.

Since in the separator according to the invention the cross sectional areas of the primary gas outlet tubes decrease in downstream direction toward the gas outlet of the separator, the pressure drop over the swirl tubes has to increase in the same direction during operation of the separator. The degree of area reduction depends on the pressure profiles in the gas inlet channel and in the gas outlet channel and should be so chosen that for each swirl tube the pressure drop substantially corresponds with the pressure difference between the gas inlet channel and the gas outlet channel at the level of said swirl tube. The area reduction of the primary gas outlet tubes enables a substantially uniform gas distribution over the swirl tubes which is essential for attaining a high efficiency.

In the separator according to the invention contact between separated liquid and inflowing gas which might cause liquid re-entrainment at high gas loads is prevented owing to the provision of a liquid collecting zone being separated from the gas inlet channel. The diameters of the primary gas outlet tubes should preferably be chosen smaller than about 65 percent of the diameters of the swirl tubes, to substantially eliminate the risk of liquid re-entrainment by the gas flow through the primary gas outlet tubes.

In a preferred embodiment of the present invention the separation zone is divided over its length into a plurality of compartments by a plurality of substantially vertical separating walls downwardly extending from the upper tray and preventing gas communication between adjacent compartments. The division of the separation zone into compartments reduces the risk of secondary gas flow maldistribution in the separation zone, which might lead to unstable operation of the swirl tubes at operation conditions which cause very steep pressure profiles in the gas inlet channel and the gas outlet channel.

The swirl tubes are preferably arranged in rows, substantially perpendicular to the longitudinal axis of the vessel, wherein the separating walls are arranged between each pair of adjacent rows of swirl tubes. By this arrangement of the swirl tubes the separator can be operated at extremely high gas loads without secondary gas maldistribution over the separation zone.

The separating walls may extend from the upper tray to the lower tray thereby preventing gas and liquid communciation between the compartments. In this variant of the proposed separator each compartment should be provided with a separate liquid withdrawal pipe for discharge of liquid to the liquid collecting zone. In a further embodiment of the invention the lower ends of the separating walls are positioned above the lower tray to such an extent that during operation separated liquid forms a seal between the lower tray and the separating walls thereby preventing gas flow between adjacent compartments. In this latter arrangement the separator is preferably provided with a known liquid level control means for maintaining a proper liquid seal between the compartments during operation of the separator. The separation zone is preferably provided with secondary gas outlet tubes rounted in openings of the upper tray and intended for discharging gas entrained by the liquid upon leaving the swirl tubes.

In order to obtain an optimum performance of the proposed separator, the secondary gas flow through the swirl tubes should be substantially constant and therefore both the primary gas outlets and the secondary gas outlets should preferably be adjusted to establish the pressure drop increase along the length of the separation zone as required for a uniform gas distribution over the swirl tubes. By determining the total cross sectional area of secondary gas outlet tubes per unit tray area in proportion with the cross sectional areas of the primary gas outlets, the gas distribution per swirl tube over the primary gas outlet and the secondary gas outlet can be optimized for each individual swirl tube. If, for example, the diameter of the primary gas outlet would be reduced without change of the secondary gas outlet, more gas would leave the separation zone via the secondary gas outlet, thereby increasing the risk of liquid re-entrainment through said secondary gas outlet. The secondary gas outlet tubes are preferably substantially uniformly distributed over the separation zone. Even more preferably, each swirl tube has its own secondary gas outlet means formed by a single outlet or a set of outlets.

Liquid, collected during operation in the part of the separation zone outside the swirl tubes, is discharged from there via, preferably, a plurality of liquid withdrawal pipes mounted in openings of the lower tray and is subsequently stored in a separate liquid collecting space. As already explained above, this liquid collecting space is, except for a degassing hole, not in direct fluid communication with the gas inlet channel. This degassing hole is preferably located at the gas outlet side of the separator to prevent false gas flows. If the separation zone is divided into a plurality of compartments, each compartment should be provided with at least one liquid withdrawal pipe.

To prevent gas flows between the different compartments the liquid withdrawal pipes are preferably sealed independently from each other. Due to the considerable difference in static pressure in the separation zone at high gas loads, the liquid backup in the liquid withdrawal pipes will steeply decrease from the separator gas inlet toward the separator gas outlet. The liquid backup in the liquid withdrawal pipes should, however, be kept within limits to prevent flooding of the lower tray or gas flow between the compartments, both phenomena resulting in instable operation of the separator. To reduce the maximum liquid level in the withdrawal pipes it may be advisable to divide the liquid collecting zone lengthwise into two or more separate, independent sections, each with its own degassing hole and liquid drainage. The liquid backup in the liquid withdrawal pipes depends on the difference between the static pressure in the liquid collecting space and the static pressure in the part of the separation zone outside the swirl tubes. The static pressure in the liquid collecting space is substantially constant over the length of said space and substantially equals the static pressure in the gas inlet channel at the location of the degassing hole. Since the static pressure in the separation zone outside the swirl tubes steeply decreases over the length of said zone it will be understood that the liquid backup largely varies over the various withdrawal pipes. By dividing the liquid collecting zone into compartments, each provided with its own degassing hole, the maximum liquid level in the liquid withdrawal pipes is considerably lowered so that this measure enables a proper elimination of the risk of flooding in the separation zone.

Care should be taken that the lower ends of the liquid withdrawal pipes are properly sealed to prevent instable operation due to upward gas flow through said pipes. To maintain the liquid level in the liquid collecting zone above the lower ends of the liquid withdrawal pipes, it is advisable to provide the liquid collecting zone with an overflow weir in each compartment, which overflow weirs divide the compartments in liquid settling space and liquid withdrawal spaces. During operation, the liquid collected in the liquid collecting spaces flows over the overflow weirs into the liquid settling spaces and is subsequently discharged from the separator.

The liquid collecting zone may form an integral part of the interior of the vessel housing the swirl tubes, or may be positioned in a separate elongated vessel below the swirl tube vessel. In the latter variant the fluid communication between the swirl tubes vessel and the liquid collecting vessel is formed by the liquid withdrawal pipes.

The gas/liquid separator shown in the Figures comprises a substantially horizontal vessel 1 with a cylindrical side wall 2 and curved end walls 3 and 4. A gas inlet 5 and a gas outlet 6 are provided in end walls 3 and 4, respectively. The interior of the vessel is divided into a gas inlet channel 7 and a gas outlet channel 8 by a substantially horizontal separation zone generally indicated with reference numeral 9. The separation zone 9 is formed by two substantially parallel, horizontal trays or tubesheets 10 and 11, vertically spaced apart from each other. The lower tray or tubesheet 10 is provided with openings 12 in which upwardly extending swirl tubes 13 are mounted. These swirl tubes 13 each comprise a cylindrical wall 14 provided with a plurality of liquid discharge openings 15 arranged above a vane assembly 16 centrally positioned with respect to the wall 14. A passage 17 for liquid is provided between the upper end of each cylindrical wall 14 and the lower side of the upper tray or tubesheet 11.

The upper tray or tubesheet 11 is provided with two sets of openings 18 and 19. In the openings 18 downwardly extending primary gas outlet tubes 20 are mounted, which tubes have their lower ends substantially coaxially arranged inside the swirl tubes 13. Downwardly extending secondary gas outlet tubes 21 are mounted in the openings 19 of upper tray 11, in such a manner that the lower ends of said secondary gas outlet tubes extend below the upper ends of the swirl tubes 13. The primary gas outlet tubes 20 and the secondary gas outlet tubes 21 become substantially gradually smaller in the direction of the main gas outlet 6 (not shown because of reduced scale of the drawings).

Figure 3:
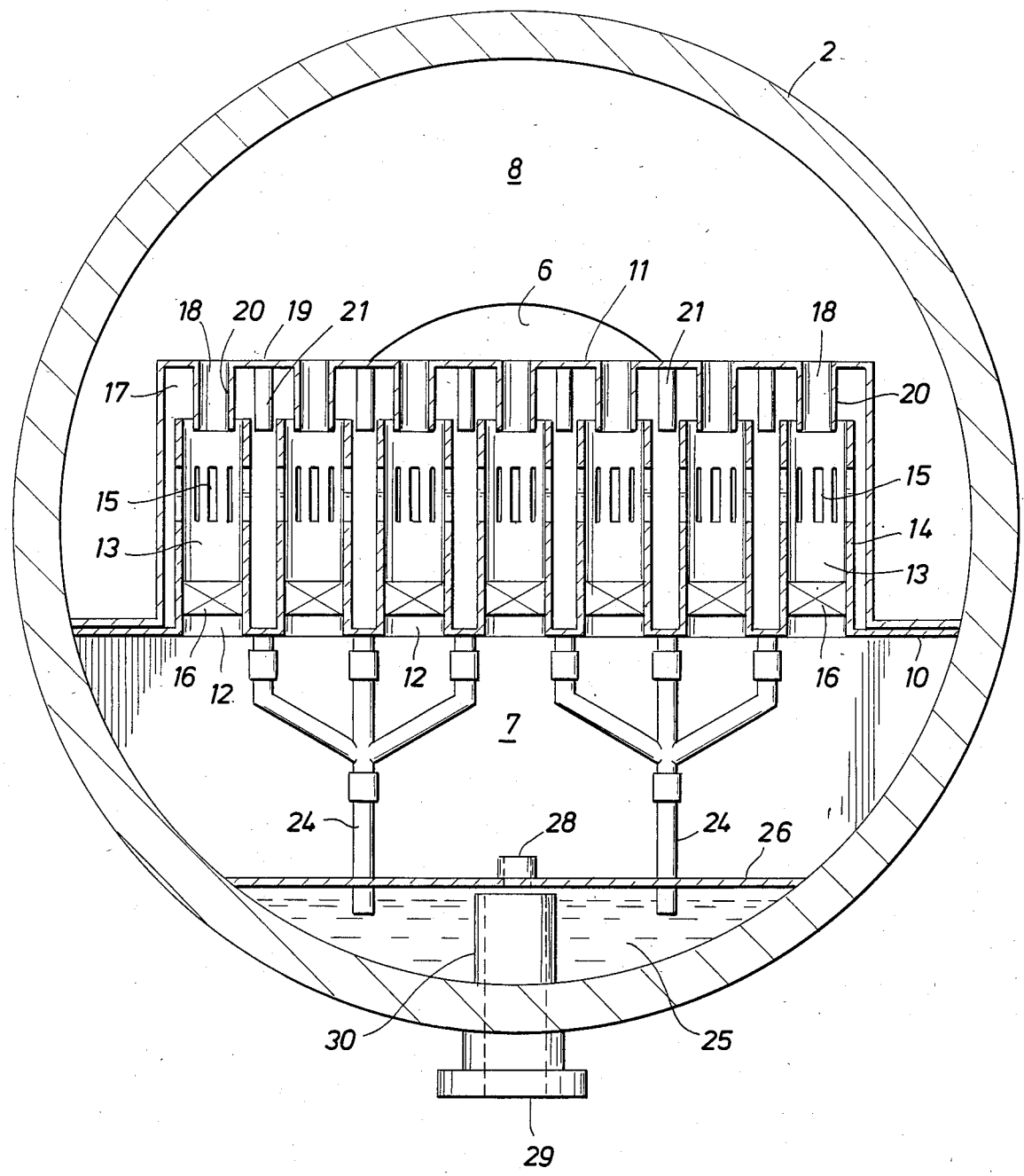
FIG. 3 shows a vertical section of the separator taken along lines III—III of FIG. 1.

The separation zone 9 is subdivided into a plurality of compartments 22 by means of substantially vertical separating walls 23 extending from the lower side of the upper tray 11 to the upper side of the lower tray 10. Each compartment 22 houses a single row of swirl tubes 13 with accompanying primary gas outlet tubes 20 and secondary gas outlet tubes 21. For discharging liquid from the compartments 22, liquid withdrawal pipes or discharge outlets 24, shown in FIG. 3, are mounted in openings in the lower tray 10, each withdrawal pipe or discharge outlet forming a fluid communication between a compartment 22 and a liquid collecting zone 25 in the bottom part of vessel 1. The liquid collecting zone 25, extending over a substantial length of the vessel, is separated from the gas inlet channel by means of a substantially horizontal wall 26, preventing contact of gas with separated liquid. The liquid collecting zone 25 is divided into two independent sections 27 each with its own degassing hole 28 in the wall 26 in each section 27, and with a liquid outlet 29 in the bottom part of the vessel side wall 2. For controlling the liquid level in the collecting zone in such a manner that the liquid withdrawal pipes 24 remain liquid sealed during operation, the sections 27 may each be provided with a substantially vertically extending overflow weir 30 arranged between the liquid withdrawal pipes 24 and the liquid outlet pipe 29, and extending the withdrawal tube below the liquid level.

The operation of the gas/liquid separator shown in the Figures is as follows. Gas contaminated with liquid particles is introduced into the gas inlet channel 7 of vessel 1 via gas inlet 5. In the gas inlet channel 7 the gas flow mass decreases in the length direction due to flow into the swirl tubes 13, so that the static pressure in said inlet channel increases in the length direction. At high gas velocities this increase in static pressure is considerable, since the pressure increase is substantially proportional with the decrease of the second power of the velocity. In the gas outlet channel 8 the reverse occurs, since there the flow increases and therefore the pressure decreases due to gas flow from the swirl tubes 13. Despite the reverse pressure profiles in the length direction of the inlet and outlet channel, the swirl tubes are substantially equally loaded with gas on account of the primary gas outlet tubes which narrow in the vessel's length direction to such an extent that at each location in the vessel the pressure drop over the swirl tubes substantially equals the pressure difference between the gas inlet and the gas outlet channel.

Upon passing the vane assemblies 16, the liquid droplets are thrown outwardly and impinge on the inner surfaces of the cylindrical walls 14. The separated liquid leaves the swirl tubes via the liquid discharge openings 15 and the passages 17 above the upper ends of the swirl tubes. A minor portion of the gas leaves the swirl tubes via the openings 5 and the passages 17, and is subsequently discharged from the separation zone 9 via the secondary gas outlet tubes 21. The area of the primary gas outlet tubes 20, through which the liquid free gas is discharged, and the area of the secondary gas outlet tubes should preferably be so correlated that during operation a minor portion of the gas leaves the swirl tubes via the liquid passages 17 and 15 thereby forming an extra driving force promoting separation of the liquid from the main gas flow. Adverse gas circulation due to pressure differences in the separation zone 9 is largely prevented by the provision of the separating walls, dividing the zone 9 into a plurality of relatively narrow compartments with a substantially flat pressure profile. The major part of separated gas enters the gas outlet channel 8 from the outlet tubes 20 while the remaining part of separated gas is supplied via the secondary gas outlet tubes 21. The separated liquid settles on the lower tray 10 and subsequently flows from the separation zone 9 via the liquid withdrawal pipes 24 into the sections 27 of the liquid collecting zone 25. The liquid is finally discharged from the vessel via the liquid outlets 29.

It is further noted that the pressure gradients in the gas inlet channel perpendicular to the main longitudinal axis of the separator vessel will only be minor in comparison with the pressure gradients in the length direction of the vessel. To prevent instabilities at extremely high gas loads, it may, however, be advantageous to split the compartments of the separation zone 9, transversely, i.e. in a direction perpendicular to the longitudinal axis of the vessel, into a plurality, such as 2 or 3, independent sections, which for the sake of simplicity are not shown in the Figures. These sections should each be provided with their own liquid and gas discharge means.

Finally, it is remarked that the gas inlet and the gas outlet need not be arranged at opposite ends of the vessel without departing from the present invention. The gas outlet may, for example, be arranged at the top of the vessel instead of in an end wall of the vessel.

What is claimed is:

1. A horizontal gas/liquid separator comprising:
   a cylindrical vessel having gas inlet and outlet openings;
   a gas inlet channel and gas outlet channel being formed in said vessel and separated from one another by a horizontal gas/liquid separating zone extending over substantially the length of said vessel, said inlet and outlet channels being connected to said inlet and outlet openings respectively;
   said gas/liquid separating zone being formed by upper and lower spaced horizontal tubesheets;
   a plurality of swirl tubes, said swirl tubes being mounted in said lower tubesheet and extending upward, the lower ends of the swirl tubes communicating with said gas inlet channel and the upper ends of the swirl tubes terminating below said upper tubesheet;
   a plurality of primary gas outlet tubes mounted in said upper tubesheet coaxial with said swirl tubes, the lower ends of said primary gas outlet tubes extending into said swirl tubes, the cross sectional area of said primary gas outlet tubes decreasing in the direction of said gas outlet to provide a substantially uniform distribution over said swirl tubes;
   a plurality of vertical separating walls, said separating walls being secured to the upper tubesheet and extending downwardly to subdivide said separating zone into a plurality of compartments;
   a liquid collecting zone having a liquid outlet, said liquid collecting zone being separated from said gas/liquid separating zone; and
   a liquid withdrawal tube communicating with the lower portion of said gas/liquid separation zone and said liquid collecting zone.

2. A horizontal gas/liquid separator as claimed in claim 1, further comprising a plurality of secondary gas outlet tubes mounted in openings of the upper tubesheet, the total cross sectional areas of said secondary gas outlet tubes per unit tray area decreases in the direction of said gas outlet to substantially the same extent as the decrease of the cross sectional areas of the primary gas outlet tubes.

3. Horizontal gas/liquid separator as claimed in claim 2, wherein said secondary gas outlet tubes are substantially uniformly distributed over the separation zone.

4. Horizontal gas/liquid separator as claimed in claim 1, wherein the swirl tubes are arranged in rows substantially perpendicular to the longitudinal axis of the vessel, each row being separately arranged in a compartment.

5. Horizontal gas/liquid separator as claimed in claim 4, wherein said separating walls extend from the upper tubesheet to the lower tubesheet, each compartment being provided with a liquid withdrawal pipe.

6. Horizontal gas/liquid separator as claimed in claim 4, wherein the lower end of each of said separating wall is positioned above said lower tubesheet to such an extent that during operation liquid forms a seal between said lower tubesheet and said separating walls.

7. Horizontal gas/liquid separator as claimed in any one of claims 1–3, wherein said liquid collecting zone is provided with a degassing hole arranged near the gas outlet of the separator.

8. Horizontal gas/liquid separator as claimed in any one of claims 1–3, wherein said liquid collecting zone is divided lengthwise into a plurality of separate sections.

9. Horizontal gas/liquid separator as claimed in any one of claims 1–3, wherein said liquid collecting zone is provided with an overflow weir dividing said liquid collecting zone into a liquid settling space and a liquid withdrawal space, the height of said overflow weir being so chosen that during operation said liquid withdrawal pipes are liquid sealed.

10. Horizontal gas/liquid separator as claimed in any one of claims 1–3, wherein said liquid collecting zone forms an integral part of the interior of the vessel.

* * * * *